United States Patent [19]

Futamura et al.

[11] 4,334,926
[45] Jun. 15, 1982

[54] BEARING MATERIAL
[75] Inventors: Kenichiro Futamura; Tatsuhiko Fukuoka, both of Toyota, Japan
[73] Assignee: Taiho Kogyo Co., Ltd., Toyota, Japan
[21] Appl. No.: 129,802
[22] Filed: Mar. 12, 1980
[30] Foreign Application Priority Data
Mar. 14, 1979 [JP] Japan ................... 54/29483
[51] Int. Cl.$^3$ ............................... B22F 3/00
[52] U.S. Cl. ...................... 75/230; 75/232; 75/234; 75/238; 75/240; 75/241; 75/244; 75/247; 308/DIG. 8
[58] Field of Search .......... 75/230, 247, 232, 234, 75/238, 240, 241, 244, 247; 308/DIG. 8

[56] References Cited
U.S. PATENT DOCUMENTS

| | | | |
|---|---|---|---|
| 2,379,435 | 7/1945 | Hensel | 75/247 |
| 2,585,430 | 2/1952 | Boegehold | 75/247 |
| 2,887,765 | 5/1959 | Thomson et al. | 75/247 |
| 2,894,838 | 7/1959 | Gregory | 75/247 |
| 3,720,507 | 3/1973 | Lundin | 308/DIG. 8 |

Primary Examiner—Brooks H. Hunt
Attorney, Agent, or Firm—Blanchard, Flynn, Thiel, Boutell & Tanis

[57] ABSTRACT

A bearing material which is excellent in seizure resistance, wear resistance and conformability. The bearing material is prepared by sintering, on a backing steel sheet, a powder mixture consisting of Cu-Pb base alloy powder or its constituent metal powders and 1 to 30 wt. % of one or more members of hard material powders. The hard material powders mean the powders of Mo, Co, $Fe_3P$, $Fe_2P$, self-fusing alloys, FeB, $Fe_2B$, Fe-Cr, Fe-Mn, Fe-Si, Cr, W; SiC and other carbides, TiN and other nitrides, and $SiO_2$ and other oxides. The bearing material of the present invention is characterized in that it has excellent sliding characteristics especially relative to the materials having rough surfaces.

9 Claims, 3 Drawing Figures

BEARING MATERIAL

BACKGROUND OF THE INVENTION (1) Field of the Invention

This invention relates to a bearing material which is made by sintering the powder of a Cu-Pb base alloy or its constituent metal powders on a backing steel sheet. Kelmet is well known to those skilled in the art as a Cu-Pb base sintered bearing alloy having excellent seizure resistance, load resistance and wear resistance. In the present invention, the properties of this Cu-Pb base sintered alloy are much improved, and the sliding characteristics relative to a contact material having a rough surface are especially improved in this novel sliding material.

(2) Description of the Prior Art

As the sintered alloys for use in making bearing materials, there are known in the prior art several alloys containing copper, lead, antimony and/or tin. Among them, Kelmet is a bearing alloy consisting mainly of copper and lead, and it has excellent seizure resistance, load resistance and wear resistance as mentioned above. It is, therefore, regarded as suitable for high speed, heavy duty purposes and is widely employed in bearings for the engines of airplanes, automobiles and the like. The above properties of the bearing material, however, largely depend upon the contact pressure, sliding speed and other operating conditions existing between the bearing surface and the contact material to be supported, and upon the hardness and other properties of the contact material itself.

For example, in spheroidal graphite cast iron and ordinary cast iron having rough surfaces, spherical or flaky graphite particles fall off from the sliding surface so that the sliding surface becomes rough. The pointed edges of this rough surface formed by the falling-off of graphite particles scratch the bearing material. Therefore, the lead particles embedded in the bearing material become liable to fall off, resulting in abnormal wearing of the bearing material. For the above reason, when the bearing material of this kind in the conventional art is brought into contact with a rough surface, the seizure resistance becomes worse in a short time, therefore, such the material is quite disadvantageous in practical uses.

BRIEF SUMMARY OF THE INVENTION

In order to eliminate the above disadvantages in the prior art, the inventors of the present application have carried out extensive research. As a result, the bearing material of the present invention having quite excellent properties was invented.

It is, therefore, the primary object of the present invention to provide a novel bearing material which is quite free from the defects in the prior art.

Another object of the present invention is to provide an improved bearing material having excellent seizure resistance, wear resistance and conformability.

A further object of the present invention is to provide a bearing material which can be produced without difficulty and conveniently employed in practice.

In accordance with the present invention, the bearing material is prepared by sintering, on a backing steel sheet, a powder mixture consisting of a powder of Cu-Pb base alloy or the constituent metal powders for preparing the same alloy and about 1 to 30 wt.% of a powder of one or more members of Mo, Co, $Fe_3P$, $Fe_2P$, FeB, $Fe_2B$, self-fusing alloys and other elements and compounds which will be described in detail hereafter.

BRIEF DESCRIPTION OF THE DRAWINGS

The objects, features and advantages of the present invention will be more clearly understood from the following description with reference to the accompanying drawings, in which.

DETAILED DESCRIPTION OF THE INVENTION

As described in the foregoing paragraph, in the preparation of the sintered alloy of the present invention, about 1 to 30 wt.% of powders of one or more members of selected hard materials are added to the powder of a Cu-Pb base alloy or its constituent metal powders for preparing the same alloy, and this powder mixture is sintered on a backing steel sheet.

The hard materials herein referred to are (a) Mo, Co, $Fe_3P$, $Fe_2P$ and self-fusing alloys; (b) FeB, $Fe_2B$, Fe-Cr and Fe-Mn; (c) Fe-Si, Cr and W; and (d) carbides such as SiC, TiC, WC and $B_4C$, nitrides such as TiN, BN and $Si_2N_4$, and oxides such as $SiO_2$, $ZrO_2$ and $Al_2O_3$. Further, the above-mentioned self-fusing alloys are those known as hard-facing alloys for use in hardening surfaces of metal by metal spraying. They are made by adding a small quantity of one or more metals such as B, Si, Mn, Fe, Mo, Cu, C, and S to a base material made of Ni, Cr, Co, W and/or WC.

The Cu-Pb base sintered alloy to be added with the above Mo and/or other hard materials basically consists of about 10 to 40 wt.% of Pb and the remainder of Cu, which is not different from the so-called Kelmet alloy of the prior art. Further, about 0.1 to 10 wt.% of Sn and/or about 0.1 to 5 wt.% of Sb can also be added to the above alloy. As the Cu-Pb sintering alloy material, both the powder of the alloy and the mixture of the powders of the constituent metals can be used.

The addition quantity of the above-mentioned hard materials is in the range of about 1 to 30 wt.%, preferably 2 to 25 wt.%, and more preferably 2 to 15 wt.% to the Cu-Pb alloy powder or its constituent metal powders.

When the above hard materials are added to the Cu-Pb alloy powder or its constituent metal powders, those in the foregoing group (a) are most desirable and the remainder are preferred in the order of (b), (c) and (d), in view of the overall characteristics of the resultant material such as seizure resistance, wear resistance and conformability. This depends upon the difference in affinity between the copper and the hard materials, the hard materials having greater affinity with copper being preferable.

The reason for the improvement in sliding characteristics caused by the addition of the hard material powders to the Cu-Pb alloy powder is considered to be as follows. When the mixture of the above hard material powders and the Cu and Pb powders are mixed together and the mixture is sintered, the particles of the hard materials are disposed in the boundaries between Cu particles and Pb particles or in the Pb particles themselves. As the result, falling off or migration of Pb particles which are excellent in their lubricating property and conformability can be avoided.

Figure 1:
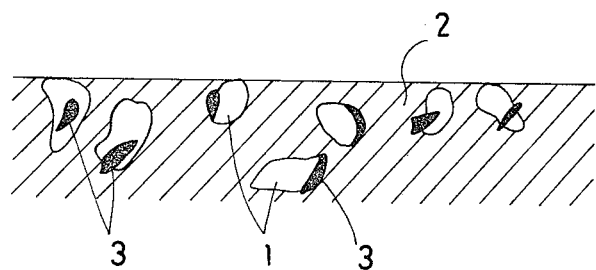
FIG. 1 is an enlarged schematic cross-sectional view of the texture of the alloys of the present invention.

FIG. 1 of the accompanying drawings shows the above-described state. The reference numeral 1 denotes Pb particles, and 2 denotes the mass of Cu particles. The hard material particles 3 exist on the boundaries between the Pb particles 1 and the Cu particles 2 or they are dispersed in Pb particles 1. Thus, the degree of joining of Pb particles to the sintered layer is increased. Owing to this mechanism, the falling off and migration of the Pb particles can be avoided, which results in the improvement in seizure resistance.

Further, since the above hard materials are harder than the ordinary sliding contact materials that are supported by a bearing, the bearing is not abraded by the contact material. This effect, together with the above Pb-supporting function, is effective to maintain quite good sliding characteristics even when the surface of the contact material is rough. As a result, the bearing material of the present invention shows excellent seizure resistance relative to contact materials. Accordingly, in view of the above discussion and the following results of experiments, the hard materials to be used are desirably selected in accordance with the kind of contact material to be used, so that the hardnesses of the hard materials may be higher than the hardness of the contact material. For example, the Vickers hardness (Hv) of spheroidal graphite cast iron during forging is about 200, and the hardness after heat treatment is about 400. The Hv's of Mo and Co are about 500 and those of other hard materials besides Mo and Co are more than about 1000.

The addition quantity of the above hard materials is in the range of about 1 to 30 wt.%. When the addition quantity is less than about 1 wt.%, the effect of the addition is scarcely obtained, while if the addition quantity becomes more than about 30 wt.%, the ratio of the hard material particles 3 shown in FIG. 1 becomes too large, so that the characteristic properties of the lead particles 1, such as conformability, cannot be exhibited.

The particle diameter of Cu-Pb base alloy powder is not more than 200 $\mu$m, and a material having a mean average diameter of 60 to 100 $\mu$m is generally employed. The particle diameter of the above-mentioned hard material powder is in the range of 5 to 200 $\mu$m and preferably 50 to 150 $\mu$m. The particle diameter of the hard material powder is related to the particle diameter of the Cu-Pb base alloy powder. When the hard material powder has a particle diameter of a value which belongs to the large size portion of the range of the particle size distribution of the Cu-Pb base alloy powder, the hard material powder is generally effective. When the particle diameter of the hard material powder is too small, the fine powder of the hard material intrudes into the Pb particles so that the load-carrying effect of the hard material is lost. Accordingly, when the particle diameters of the Cu-Pb base alloy powder are within the range of about 60 to 100 $\mu$m, it is desirable to add hard material powder having a particle diameter of about 100 $\mu$m.

In the following, an example of the method for making the bearing material of the present invention is described.

First, the Cu-Pb base alloy powder and the powder of the suitable hard materials selected are well mixed by a blender for about 1 hour or more. This powder mixture is then spread over a backing steel sheet that has been treated by sanding. This material is then subjected to preliminary sintering (primary sintering) for about 10 minutes at a temperature suitable for the Cu-Pb base alloy, for example, 780° C. to 880° C. Since the preliminary sintering is carried out only by spreading the component powder, the surface of the sintered material is not even and the powder particle layer is not dense. Accordingly, in order to make the surface of the sintered material smooth, and make the density of the sintered material uniform and join the powder particles closely, the above material is rolled. After that, the material is subjected to full sintering (secondary sintering) at a temperature, for example, as described above, of 780° to 880° C. for about 10 minutes.

It should be noted that the above method is only an example and any other methods and production conditions that are well known to those skilled in the art may of course be employed.

The bearing material of the present invention obtained through the above method can be used as the sliding material of bearings, washers to receive thrust loads, bushes to receive radial loads, and for other various purposes.

Figure 2:
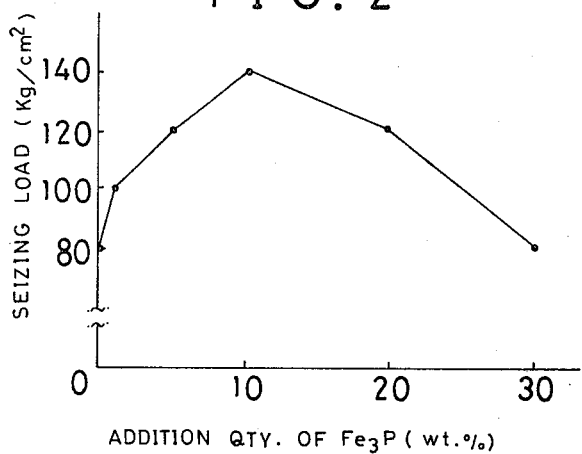
FIG. 2 is a graph showing the relation between the addition quantities of a hard material and seizing loads.

FIG. 2 shows the measurement results of tests carried out under the following conditions. In the tests, the ratio of Pb was 24 wt.% (constant) but the quantity of a hard material ($Fe_3P$) was varied, the remainder being Cu, and the seizing load was measured. In addition similar results were obtained when the ratio of Pb was varied.

| Test Conditions | |
| --- | --- |
| Test machine: | Seizure tester |
| Sliding Velocity: | 15 m/sec. |
| Lubricant oil: | SAE 30# (1 part) + light oil (2 parts) |
| Qty. of lubricant oil: | 0.2 mm/cc |
| Disk (contact material): | Spheroidal graphite cast iron. surface roughness: 0.8–1 $\mu$m |
| Environmental temp.: | Room temp. (ca. 20° C.) |
| Loads: | Static, gradually increased by 20 Kg/cm$^2$ per 30 min. |

The effects of the bearing material of the present invention will be explained with reference to the experimental results.

Various specimens as shown in Table 1 were tested under the above-described test conditions and the results of the seizing load measurements are shown in Table 1. Specimen Nos. 1 to 34 are the bearing materials of the present invention, and specimen Nos. 35 to 38 are conventional Kelmet bearing materials as comparative examples. In seizing load test I, the surface roughness of the contact material was 0.8 to 1 $\mu$m, and in the seizing load test II, the surface roughness thereof was 1.6–2 $\mu$m. The symbol Re means remainder or balance; Ni B., nickel base alloy; Co B., cobalt base alloy; and (*), self-fusing alloy.

TABLE 1

| Specimen No. | Kelmet |||||||Fe3P|Fe2P|B.*|Ni*|Co|FeB|Fe2B|FeCr|FeMn|FeSi|Cr|W|SiC|TiC|WC|B4C|TiN|BN|Si3N4|SiO2|ZrO2|Al2O3|Wearing (mg)|Seizing Load (kg/cm²) ||
|---|---|---|---|---|---|---|---|---|---|---|---|---|---|---|---|---|---|---|---|---|---|---|---|---|---|---|---|---|---|---|---|---|---|
| | Cu | Pb | Sn | Sb | Ni | Mo | Co | | | | | | | | | | | | | | | | | | | | | | | | I | II |
| This Invention |
| 1 | Re | 10 | — | — | — | — | — | — | — | — | — | — | — | — | — | — | — | — | — | — | — | — | — | — | — | — | — | — | — | — | — | 120 | 80 |
| 2 | Re | 10 | 2 | 4 | — | — | 2 | — | — | — | 5 | — | — | — | — | — | — | — | — | — | — | — | — | — | — | — | — | — | — | — | 0.9 | 120 | 80 |
| 3 | Re | 10 | 2 | 10 | — | — | — | — | — | — | — | — | — | — | — | — | — | — | — | — | — | — | — | — | — | — | — | — | — | — | — | 100 | 100 |
| 4 | Re | 15 | — | 1 | — | — | 1 | — | — | — | 1 | — | — | 10 | — | — | — | — | — | — | — | — | — | — | — | — | — | — | — | — | 100 | 100 |
| 5 | Re | 15 | 1 | — | — | — | — | — | 10 | — | — | — | — | 1 | — | — | — | — | — | — | — | — | — | — | — | — | — | — | — | 0.5 | 80 | 80 |
| 6 | Re | 20 | — | — | — | — | 2 | — | — | — | 10 | — | — | 7 | — | — | — | — | — | — | — | — | — | — | — | — | — | — | — | — | 120 | 120 |
| 7 | Re | 24 | 3 | — | — | — | — | 5 | — | — | — | — | — | — | — | — | — | — | — | — | — | — | — | — | — | — | — | — | — | — | — | 140 | 100 |
| 8 | Re | 24 | 3 | — | — | — | — | — | — | 5 | 10 | — | — | — | — | — | — | — | — | — | — | — | — | — | — | — | — | — | — | — | 0.6 | 140 | 140 |
| 9 | Re | 24 | 3 | 0.2 | — | — | — | — | 5 | — | — | — | — | 10 | — | — | — | — | — | — | — | — | — | — | — | — | — | — | — | — | — | 140 | 140 |
| 10 | Re | 24 | 3 | — | — | 1 | — | — | — | — | 20 | — | — | — | — | — | — | — | — | — | — | — | — | — | — | — | — | — | — | — | — | 120 | 120 |
| 11 | Re | 24 | 3 | — | — | — | — | — | — | — | 30 | — | — | — | 1 | — | — | — | — | — | — | — | — | — | — | — | — | — | — | 0.5 | 80 | 80 |
| 12 | Re | 30 | — | — | — | — | 5 | — | — | — | 2 | — | — | 2 | — | — | — | — | — | — | — | — | — | — | — | — | — | — | — | — | 140 | 80 |
| 13 | Re | 30 | 3 | — | — | — | 5 | — | 1 | 2 | 3 | — | — | 20 | — | — | — | — | — | — | — | — | — | — | — | — | — | — | — | 0.5 | 120 | 120 |
| 14 | Re | 35 | — | — | — | — | 5 | — | — | — | — | — | — | 1 | — | — | — | — | — | — | — | — | — | — | — | — | — | — | — | 0.3 | 140 | 100 |
| 15 | Re | 35 | 3 | — | — | — | — | — | — | — | — | — | — | — | — | 3 | — | — | — | 2 | — | — | — | — | — | — | — | — | — | — | 140 | 120 |
| 16 | Re | 35 | 1 | 0.5 | — | — | — | — | — | — | — | — | — | — | — | — | 1 | — | 2 | — | — | — | — | — | — | — | — | — | — | — | 80 | 80 |
| 17 | Re | 5 | 5 | — | — | — | — | — | — | — | — | — | — | — | 6 | — | — | — | — | 5 | — | — | — | — | — | — | — | — | — | — | 100 | 100 |
| 18 | Re | 5 | 5 | 0.5 | — | — | — | — | — | 2 | 3 | — | — | — | — | — | 2 | — | — | — | 0.5 | — | — | — | — | — | — | — | — | — | 100 | 80 |
| 19 | Re | 10 | — | — | 1 | — | — | — | — | — | — | — | — | — | — | — | 2 | 2.5 | 3 | — | — | — | 10 | — | — | — | 1 | — | — | 0.9 | 100 | 80 |
| 20 | Re | 10 | 8 | 1 | — | — | — | — | — | — | — | — | 5 | — | — | 3 | — | — | — | — | — | — | — | 3 | — | 3 | — | — | — | 0.8 | 100 | 80 |
| 21 | Re | 10 | 8 | — | — | — | — | — | — | — | — | — | — | — | — | — | — | — | — | — | — | — | — | — | 3 | — | — | — | — | 0.3 | 120 | 80 |
| 22 | Re | 15 | 3 | 0.5 | — | — | — | — | — | — | — | — | — | — | — | — | 2 | — | 5 | — | — | — | — | — | 15 | — | — | — | — | — | 140 | 100 |
| 23 | Re | 15 | 3 | — | 2 | — | — | — | — | — | — | — | — | — | — | 2 | — | — | — | — | — | — | — | — | — | — | — | — | 3 | — | 140 | 120 |
| 24 | Re | 15 | — | 0.5 | — | — | — | — | — | — | — | — | — | — | — | — | — | — | — | — | — | — | 20 | — | — | — | — | 3 | — | — | 120 | 100 |
| 25 | Re | 20 | 3 | 0.5 | — | — | — | — | — | — | — | — | — | — | — | — | — | — | — | — | — | — | — | — | — | — | — | — | — | — | 100 | 100 |
| 26 | Re | 20 | 3 | — | 5 | — | — | 5 | — | — | — | — | — | — | — | — | — | — | — | — | — | — | — | — | — | — | — | — | — | — | 120 | 120 |
| 27 | Re | 20 | 5 | — | — | — | — | — | — | — | — | — | — | — | — | 5 | — | — | — | — | — | — | — | — | — | — | — | — | — | 0.7 | 120 | 100 |
| 28 | Re | 25 | 4 | — | — | — | — | — | — | — | — | — | — | — | 6 | — | — | — | — | — | — | — | — | — | — | — | — | — | — | — | 140 | 120 |
| 29 | Re | 25 | 6 | 2 | — | — | — | — | — | — | — | — | — | — | — | — | — | — | — | — | — | — | — | — | — | — | — | — | — | 0.3 | 100 | 100 |
| 30 | Re | 25 | — | — | — | — | — | — | — | — | — | — | — | — | — | — | — | 5 | — | — | — | — | — | — | — | — | — | — | — | — | 140 | 120 |
| 31 | Re | 30 | 3 | 2 | — | — | — | — | — | — | — | — | — | — | — | — | — | — | — | — | — | — | — | — | — | — | — | — | — | — | 120 | 80 |
| 32 | Re | 30 | 5 | 2 | — | — | — | — | — | — | — | — | — | — | — | — | — | — | — | — | — | — | — | — | — | — | — | — | — | — | 100 | 80 |
| Comparative |
| 35 | Re | 10 | 10 | — | — | — | — | — | — | — | — | — | — | — | — | — | — | — | — | — | — | — | — | — | — | — | — | — | — | 1.2 | 60 | 40 |
| 36 | Re | 24 | — | — | — | — | — | — | — | — | — | — | — | — | — | — | — | — | — | — | — | — | — | — | — | — | — | — | — | — | 80 | 20 |
| 37 | Re | 24 | 3 | — | — | — | — | — | — | — | — | — | — | — | — | — | — | — | — | — | — | — | — | — | — | — | — | — | — | 2.0 | 80 | 20 |
| 38 | Re | 35 | 7 | — | — | — | — | — | — | — | — | — | — | — | — | — | — | — | — | — | — | — | — | — | — | — | — | — | — | 1.8 | 60 | 20 |

From the results of seizing loads in Table 1, it will be understood that the seizure resistances of the bearing materials of the present invention are clearly improved as compared with those of the conventional materials. In addition, even when the surface roughness of the contact material is increased, the seizure resistances of the specimens of the present invention are maintained on the same levels or, even when they are lowered to some extent, the seizure resistances are still large. This contrasts with the results of the conventional materials for which the seizure resistances becomes very small when the surface roughness of contact material is increased. Therefore, fact that the excellent seizure resistance can be maintained in the present invention even when the surface roughness of contact material becomes great has been proved.

Wearing tests were carried out in connection with some of the specimens in Table 1 under the foregoing test conditions, and the results thereof are also shown in Table 1. The wearing test loads were dynamic loads varying in the range of 0 to 80 kg/cm$^2$ and test time was 50 hours. The size of the sliding contact surface was 17 mm$\phi$.

It is considered that the excellence in wear resistance of the bearing materials of the present invention as compared with the conventional materials depends upon the effect that the Pb particles are supported by the hard materials that are harder than the contact material.

Figure 3:
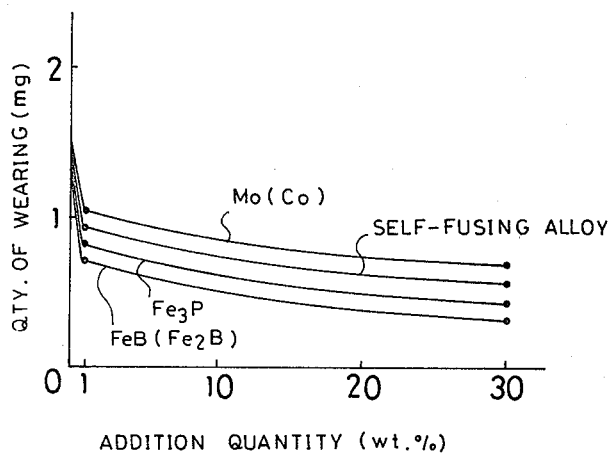
FIG. 3 is a graph showing the relation between the addition quantities of several kinds of hard materials and quantities of wearing.

Naturally, the quantity of wear decreases with increases in the quantity of hard material. When only one kind of the hard material is added to Cu-Pb base alloy (Pb: 24%, Sn: 3.5%, Cu: remainder), the wear-decreasing effects greater as the following hard materials are employed: FeB (or Fe$_2$B), Fe$_3$B, self-fusing alloy, Mo (or Co). FIG. 3 shows wear-decreasing effects with variation in kind and addition quantities of the hard materials. The quantities of wearing in this graph are the results of 50 hour tests carried out in the same manner as the foregoing tests.

From the above discussion, it may be understood that the seizure resistance and the wear resistance of Cu-Pb base alloy material of the present invention is much improved by the addition of the hard materials such as Mo, Co, Fe$_3$P, FeB, Fe$_2$B and self-fusing alloy. The foregoing elements and compounds, in addition, even when the surface roughness of the contact material is large, will maintain these properties without causing lowering thereof.

Although the present invention has been described in connection with preferred examples thereof, many variations and modifications will now become apparent to those skilled in the art. The scope of the present invention, therefore, is not limited by the specific embodiments shown herein.

What is claimed is:

1. In a bearing material comprising a steel backing sheet having a sintered Cu-Pb base alloy layer thereon, wherein said Cu-Pb base alloy layer consists essentially of islands of Pb dispersed in a Cu matrix, the improvement which comprises: said Cu-Pb base alloy layer contains dispersed therein from 1 to 30 wt.%, based on the total weight of said copper-lead base alloy layer, of particles of one or more hard materials selected from the group consisting of Mo, Co, Fe$_3$P, Fe$_2$P, FeB, Fe$_2$B, FeCr, FeMn, FeSi, Cr, W, SiC, TiC, WC, B$_4$C, TiN, BN, Si$_2$N$_4$, SiO$_2$ and ZrO$_2$.

2. A bearing material as claimed in claim 1, wherein the average size of the particles of said hard material is approximately the same as the largest size particles of the Cu-Pb base alloy powder or the constituent metal powders thereof used to form said Cu-Pb base alloy.

3. A bearing material as claimed in claim 1, wherein said Cu-Pb base alloy consists essentially of 10 to 40 wt.% of Pb and the remainder of Cu.

4. A bearing material as claimed in claim 1, wherein said Cu-Pb base alloy consists essentially of 10 to 40 wt.% Pb, one or two members selected from the group consisting of 0.1 to 10 wt.% Sn and 0.1 to 5 wt.% Sb, and the remainder of Cu.

5. A bearing material as claimed in claim 1, wherein said bearing material is in sliding contact with a contact material which is made of spheroidal graphite cast iron or ordinary cast iron.

6. A bearing material as claimed in claim 1, wherein said bearing material is in sliding contact with a contact material having a roughness of 1 μm or higher.

7. A bearing material as claimed in claim 1, wherein said particles of hard material are embedded in said islands of lead dispersed in the copper matrix.

8. A bearing material as claimed in claim 1, wherein said sintered Cu-Pb base alloy layer is prepared by sintering a mixture of particles Cu and Pb or Cu-Pb alloy having an average diameter not greater than 200 μm, and particles of said hard material having diameters in the range of 5 to 200 μm.

9. A bearing material as claimed in claim 8, wherein said particles of Cu and Pb or Cu-Pb alloy have an average diameter in the range of 60 to 100 μm, and the particles of said hard material powder have an average diameter of approximately 100 μm.

* * * * *